United States Patent [19]
Shimasaki et al.

[11] Patent Number: 5,555,725
[45] Date of Patent: Sep. 17, 1996

[54] CONTROL SYSTEM FOR ELECTRICALLY HEATED CATALYST OF INTERNAL COMBUSTION ENGINE

[75] Inventors: Yuichi Shimasaki; Takashi Komatsuda; Hiroaki Kato; Takuya Aoki, all of Wako, Japan

[73] Assignee: Honda Giken Kogyo Kabushiki Kaisha, Tokyo, Japan

[21] Appl. No.: 503,340

[22] Filed: Jul. 17, 1995

[30] Foreign Application Priority Data

Aug. 22, 1994 [JP] Japan .................................. 6-196803

[51] Int. Cl.$^6$ ................................................... F01N 3/28
[52] U.S. Cl. ........................... 60/277; 60/284; 60/300; 219/202; 219/497
[58] Field of Search ......................... 60/277, 284, 300; 219/202, 205, 497

[56] References Cited

U.S. PATENT DOCUMENTS

| | | | |
|---|---|---|---|
| 5,163,290 | 11/1992 | Kinnear | 60/284 |
| 5,257,501 | 11/1993 | Wataya | 60/300 |
| 5,321,231 | 6/1994 | Schmalzriedt | 219/497 |
| 5,388,404 | 2/1995 | Tsumura | 60/300 |

FOREIGN PATENT DOCUMENTS 6-81636   3/1994   Japan .

*Primary Examiner*—Douglas Hart
*Attorney, Agent, or Firm*—Nikaido, Marmelstein, Murray & Oram LLP

[57] ABSTRACT

A control system controls an electrically heated catalyst for purifying exhaust gases emitted from an internal combustion engine. Voltage applied to the electrically heated catalyst and electric current flowing through the same are detected. A changeover is made between supply and interrupt of power to the electrically heated catalyst. A parameter indicative of an operative state of the electrically heated catalyst is calculated based on the detected voltage and the detected current, and the operative state of the electrically heated catalyst is detected based on the parameter. The changeover between the supply and interrupt of power to the electrically heated catalyst is controlled based the operative state of the electrically heated catalyst thus detected.

18 Claims, 7 Drawing Sheets

15 OPERATIVE STATE-DETECTING CIRCUIT

18 OPERATIVE STATE-DETECTING CIRCUIT

5,555,725

CONTROL SYSTEM FOR ELECTRICALLY HEATED CATALYST OF INTERNAL COMBUSTION ENGINE

BACKGROUND OF THE INVENTION

1. Field of the Invention

This invention relates to a control system for an electrically heated catalyst of an internal combustion engine, which controls the operation of an electrically heated catalyst (hereinafter referred to as "the EHC") for purifying exhaust gases emitted from the engine, and more particularly to an electrically heated catalyst control system of this kind which monitors temperature rise, power consumption, or electrical resistance of the EHC, based on the voltage and current of power supplied to the EHC to thereby control the supply of power to the same, and detect abnormality of the same.

2. Prior Art

Conventionally, an electrically heated catalyst control system has been proposed by Japanese Laid-Open Patent Publication (Kokai) No. 6-81636, which comprises a catalyst temperature sensor formed e.g. by a thermocouple or a thermistor, for detecting the catalyst temperature of the EHC, detector means for detecting the operative state of the catalyst temperature sensor, switch means for making a changeover between the supply of power to the EHC and the cutoff of the same, and control means for controlling the operation of the switch means based on a signal delivered from the detector means. According to the proposed system, if abnormality of the catalyst temperature sensor, such as a disconnection and a short-circuit, is detected by the detector means, the control means operates to control the operation of the switch means such that the supply of power to the EHC is limited within a predetermined time period to prevent overheating of the EHC and complete heating failure of the EHC.

Further, an electrically heated catalyst control system is also known, which uses a voltage/current-sensing circuit for detecting the voltage and current of power supplied to the EHC to thereby monitor the operative state thereof.

FIG. 1 shows a typical voltage/current-sensing circuit employed in the known electrically heated catalyst control system.

In the figure, electric current $I_{EHC}$ flowing through the EHC is detected from a voltage drop $V_S$ across a shunt resistance $R_S$ serially connected between the EHC and a battery $E_B$.

The former conventional electrically heated catalyst control system using the catalyst temperature sensor, such as a thermocouple, is required to be arranged in the catalyst in a high-temperature environment, which causes problems of degraded operating characteristics and/or a shortened life of the catalyst temperature sensor per se. Further, the catalyst temperature sensor is liable to become faulty due to a disconnection or a short-circuit in the wiring.

Although the latter control system using the voltage/current-sensing circuit is advantageous in that it need not detect the voltage $V_{EHC}$ and the current $I_{EHC}$ in the high-temperature environment, it suffers a problem that the voltage $V_{EHC}$ applied to the EHC decreases due to the voltage drop ($V_S$) caused by the shunt resistance $R_S$ interposed between the battery and the EHC.

Further, since the electric current $I_{EHC}$ is set to a very large value, heat is generated by the shunt resistance $R_S$, which causes a variation in the resistance value thereof, resulting in degraded detection accuracy of the voltage/current-sensing circuit. To overcome this inconvenience, it is necessary to employ a resistance which withstands a large power and has an accurate resistance value, leading to an increased manufacturing cost.

SUMMARY OF THE INVENTION

It is the object of the invention to provide an electrically heated catalyst control system which does not adversely affect the operation of an electrically heated catalyst (EHC) and the detection accuracy of a sensing system thereof, and hence can detect the operative state of the EHC with high accuracy and high reliability.

To attain the above object, according to a first aspect of the invention, there is provided a control system for an electrically heated catalyst for purifying exhaust gases emitted from an internal combustion engine, comprising:

voltage-detecting means for detecting voltage applied to the electrically heated catalyst;

current-detecting means for detecting electric current flowing through the electrically heated catalyst;

switch means for making a changeover between supply and interrupt of power to the electrically heated catalyst;

operative state-detecting means for calculating a parameter indicative of an operative state of the electrically heated catalyst, based on an output from the voltage-detecting means and an output from the current-detecting means, and for detecting the operative state of the electrically heated catalyst, based on the parameter thus calculated; and switch controller means for controlling operation of the switch means, based on an output from the operative state-detecting means.

Preferably, the operative state-detecting means calculates catalyst temperature, based on the output from the voltage-detecting means and the output from the current-detecting means, and detects the operative state of the electrically heated catalyst, based on the catalyst temperature thus calculated.

Alternatively, or in combination, the operative state-detecting means calculates catalyst consumption power consumed by the electrically heated catalyst, based on the output from the voltage-detecting means and the output from the current-detecting means, and detects the operative state of the electrically heated catalyst, based on the catalyst consumption power thus calculated.

More preferably, the operative state-detecting means calculates an integrated value of the catalyst consumption power, and detects the operative state of the electrically heated catalyst, based on the integrated value of the catalyst consumption power thus calculated.

Alternatively, or in combination, the operative state-detecting means calculates catalyst resistance of the electrically heated catalyst, based on the output from the voltage-detecting means and the output from the current-detecting means, and detects the operative state of the electrically heated catalyst, based on the catalyst resistance thus calculated.

Alternatively, or in combination, the operative state-detecting means compares the output from the voltage-detecting means with a predetermined reference voltage value, and the output from the current-detecting means with a predetermined reference current value, to calculate the parameter indicative of the operative state of the electrically heated catalyst, and detects the operative state of the electrically heated catalyst, based on the parameter thus calculated.

More preferably, the operative state-detecting means comprises voltage comparator means for comparing the output from the voltage-detecting means with the predetermined reference voltage value, current comparator means for comparing the output from the current-detecting means with the predetermined reference current value, and logical OR means for calculating a logical sum of an output from the voltage comparator means and an output from the current comparator means.

Preferably, the operative state-detecting means comprises memory means for storing predetermined reference values set based on design values or experimentally obtained values of the parameter indicative of the operative state of the electrically heated catalyst, calculator means for calculating the parameter, based on the output from the voltage-detecting means and the output from the current-detecting means, and comparator means for comparing the parameter thus calculated with one of the predetermined reference values read from the memory means, and for outputting a result of the comparison.

Preferably, the current-detecting means comprises a non-contact sensor.

Preferably, the control system includes abnormality-detecting means for detecting abnormality of the electrically heated catalyst, based on the output from the operative state-detecting means.

According to a second aspect of the invention, there is provided a control system for an electrically heated catalyst for purifying exhaust gases emitted from an internal combustion engine, comprising:

voltage-detecting means for detecting voltage applied to the electrically heated catalyst;

current-detecting means for detecting electric current flowing through the electrically heated catalyst;

operative state-detecting means for calculating a parameter indicative of an operative state of the electrically heated catalyst, based on an output from the voltage-detecting means and an output from the current-detecting means, and for detecting the operative state of the electrically heated catalyst based on the parameter thus calculated; and abnormality-detecting means for detecting abnormality of the electrically heated catalyst, based on an output from the operative state-detecting means.

Preferably, the control system includes switch means for making a changeover between supply and interrupt of power to the electrically heated catalyst, and switch controller means for controlling operation of the switch means, based on the output from the operative state-detecting means.

The above and other objects, features, and advantages of the invention will become more apparent from the following detailed description taken in conjunction with the accompanying drawings.

DETAILED DESCRIPTION

The invention will now be described in detail with reference to FIG. 2 to FIG. 10B showing embodiments thereof.

Figure 2:
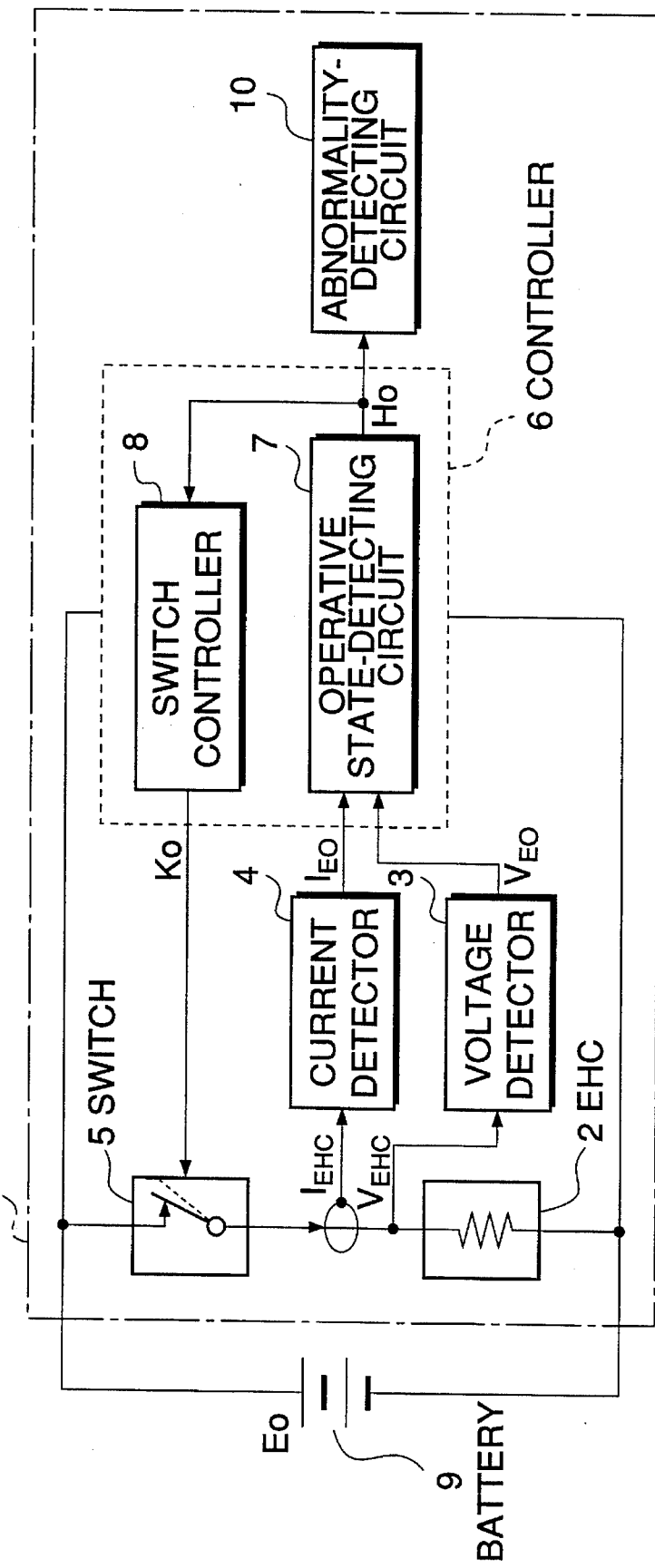
FIG. 2 is a circuit diagram showing the arrangement of essential parts of an electrically heated catalyst control system, which are common to first to fifth embodiments of the invention.

Referring first to FIG. 2, there is shown the arrangement of essential parts of an electrically heated catalyst control system for an internal combustion engine according to the invention, which are common to all the embodiments of the invention.

In the figure, reference numeral 1 designates the electrically heated catalyst control system which is comprised of a voltage detector 3 for detecting voltage $V_{EHC}$ applied to an electrically heated catalyst (EHC) 2 for purifying exhaust gases emitted from the engine, and generating a voltage signal $V_{EO}$ indicative of the detected voltage, a current detector 4 for detecting an electric current $I_{EHC}$ flowing through the EHC 2 and generating a current signal $I_{EO}$ indicative of the detected current, a switch 5 for selecting the supply of power to the EHC 2 or the cutoff of the same, a controller 6 for controlling the ON/OFF operation of the switch 5, based on the voltage signal $V_{EO}$ from the voltage detector 3 and the current signal $I_{EO}$ from the current detector 4, and an abnormality-detecting circuit 10 responsive to an output from the controller 6 for detecting abnormality of the EHC 2 and notifying the driver of the same.

The electrically heated catalyst control system 1 is driven by supply DC voltage $E_O$ from a battery 9 in the present embodiment. Alternatively, it may be driven by DC voltage $E_O$ from a generator.

The electrically heated catalyst control system 1 constructed as above operates in the following manner: When an ignition switch, not shown, of a vehicle, not shown, on which the engine is installed, is turned on to apply the DC supply voltage $E_O$ (12 volts) from the battery 9 to the controller 6, the controller 6 operates such that the switch 5 is turned on to apply the supply DC voltage $E_O$ to the EHC 2 over a predetermined time period to thereby heat the EHC 2 at a steep temperature rise rate (e.g. 500° C./10 seconds) to activate the same. The EHC 2 thus activated starts to purify noxious components contained in the exhaust gases emitted from the engine. In the course of activation of the EHC 2, the voltage $V_{EHC}$ applied thereto and the current $I_{EHC}$ flowing therethrough are monitored, whereby if it is determined that the EHC 2 is not in a predetermined operative state, the switch 5 is turned off to interrupt supply of power (supply DC voltage $E_O$) to the EHC 2, and at the same time it is determined that the EHC 2 is abnormal in operation and the driver is notified of abnormality of the EHC 2.

The voltage detector 3 detects the voltage $V_{EHC}$ applied to the EHC 2 and delivers the voltage signal $V_{EO}$ in the form of a digital value indicative of the detected voltage to the controller 6.

The voltage detector 3 is constituted by part of a memory and a comparator of a microprocessor which also constitutes the control circuit 6, is adapted to generate the voltage signal $V_{EO}$ in the form of 8-bit data (256 steps).

The current detector 4 is formed of a non-contact sensor, e.g. a Hall element, and detects magnetic field strength generated by the direct current flowing through the EHC 2 and delivers the current signal $I_{EO}$ in the form of 8-bit data (256 steps) proportional in value to the current $I_{EHC}$ flowing through the EHC 2, to the controller 6.

The switch 5 is formed by a switching element, such as a relay, an FET (field-effect transistor) or a bipolar transmission which has a large current capacity, and carries out ON/OFF operation in response to a control signal $K_O$ from the controller 6 to select the supply of power (supply DC voltage $E_O$) to the EHC 2 or the cutoff of the same.

The controller 6 is implemented by the microprocessor and its peripheral circuits and includes an operative state-detecting circuit 7 and a switch controller 8.

The operative state-detecting circuit 7 is comprised of a memory, such as a ROM or a RAM storing predetermined reference values, a block having a computing function, a block having a comparing/determining function, and a timer, as described in detail hereinbelow. The operative state-detecting circuit 7 calculates catalyst temperature $T_{EHC}$ (temperature of the EHC 2), catalyst consumption power $P_{EHC}$ (power consumed by the EHC 2), catalyst resistance $R_{EHC}$ (electric resistance of the EHC 2), or catalyst integrated consumption power $P_S$ (integrated value of power consumed by the EHC 2), based on the voltage signal $V_{EO}$ from the voltage detector 3 and the current signal $I_{EO}$ from the current detector 4, and compares results of the calculation with the predetermined reference values stored in the memory to determine the operative state of the EHC 2. A determination signal $H_O$ indicative of results of the comparison is delivered from the operative state-detecting circuit 7 to the switch controller 8 and the abnormality-detecting circuits 10.

The switch controller 8, which is implemented by an output interface circuit, etc. of the microprocessor, delivers the aforementioned control signal $K_O$ at a level (in terms of current or voltage with a predetermined polarity) required for driving the switch 5.

The abnormality-detecting circuit 10, which is implemented by a visual indicator, such as an LED (light-emitting diode) or an LCD (liquid crystal display), or an audio indicator formed by a voice synthesizer, or the like, is arranged in an instrument panel in a compartment of the vehicle for determining abnormality of the EHC 2 and notifying the driver of the same by visual or audio indication in response to the determination signal $H_O$ from the operative state-detecting circuit 7.

Figure 1:
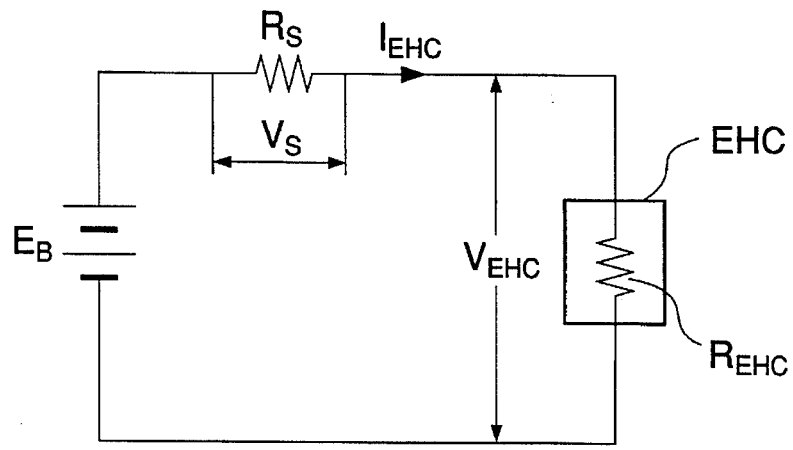
FIG. 1 is a circuit diagram showing the arrangement of conventional voltage/current-sensing circuit.
Figure 3:
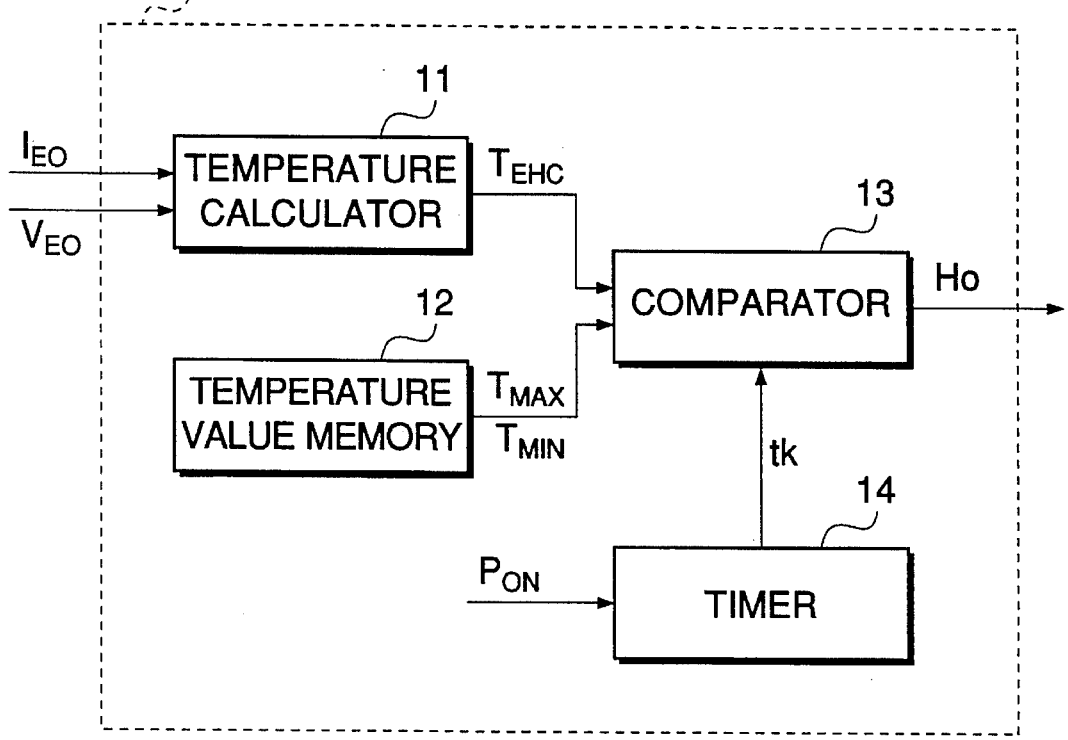
FIG. 3 is a circuit diagram showing the arrangement of essential parts of an operative state-detecting circuit of the electrically heated catalyst control system according to the first embodiment.

FIG. 3 shows the arrangement of essential parts of the operative state-detecting circuit 7 of the electrically heated catalyst control system according to the first embodiment.

In the present embodiment, the operative state of the EHC 2 is determined based on the catalyst temperature $T_{EHC}$ calculated from the voltage signal $V_{EO}$ and the current signal $I_{EO}$.

The operative state-detecting circuit 7 is comprised of a temperature calculator 11, a temperature value memory 12, a comparator 13, and a timer 14. The operative state-detecting circuit 7 calculates the catalyst temperature $T_{EHC}$ from the voltage signal $V_{EO}$ and the current signal $I_{EO}$, and compares the catalyst temperature $T_{EHC}$ thus calculated with an upper limit value $T_{MAX}$ and a lower limit value $T_{MIN}$ of the catalyst temperature both set relative to a time period elapsed after the start of the engine. If the catalyst temperature $T_{EHC}$ falls outside a range defined by the upper limit value $T_{MAX}$ and the lower limit value $T_{MIN}$ ($T_{EHC}<T_{MIN}$ or $T_{MAX}<T_{EHC}$), the operative state-detecting circuit 7 delivers the determination signal $H_O$ e.g. at a high level to cause the switch controller 8 to turn off the switch 5, whereby the supply of power (supply DC voltage $E_O$) to the EHC 2 is interrupted.

Further, the operative state-detecting circuit 7 delivers the high-level determination signal $H_O$ to the abnormality-detecting circuit 10 to cause the same to carry out visual or audio indication of abnormality of the EHC 2.

On the other hand, if the catalyst temperature $T_{EHC}$ falls within the range defined by the upper limit value $T_{MAX}$ and the lower limit value $T_{MIN}$ ($T_{MIN} \leq T_{EHC} \leq T_{MAX}$), the operative state-detecting circuit 7 delivers the determination signal $H_O$ e.g. at a low level to cause the switch controller 8 to hold the switch 5 on, whereby the supply of power (supply DC voltage $E_O$) to the EHC 2 is continued.

On this occasion, the abnormality-detecting circuit 10 determines from the determination signal $H_O$, which is low in level, that the EHC is functioning normally, and does not carry out visual indication or audio indication.

The temperature calculator 11 operates to calculate the catalyst temperature $T_{EHC}$ by the use of the following equation (1) from the voltage signal $V_{EO}$ and the current signal $I_{EO}$ and delivers a catalyst temperature signal indicative of the calculated catalyst temperature $T_{EHC}$ to the comparator 13:

$$T_{EHC} = \frac{1}{4.2 \cdot m \cdot a} \int_0^T (V_{EO} \times I_{EO}) \, dt \qquad (1)$$

where m represents the mass of the EHC 2, $\alpha$ the specific heat of the EHC 2, and T a time period over which the EHC 2 is energized.

The temperature value memory 12, which is formed of a ROM or the like, stores data of the upper limit value $T_{MAX}$ and the lower limit value $T_{MIN}$ of the catalyst temperature set relative to a time period elapsed after the start of the engine. The upper limit value $T_{MAX}$ and the lower limit value $T_{MIN}$ are set based on design values and/or experimentally obtained values of the catalyst temperature. The temperature value memory 12 supplies values of the upper limit value $T_{MAX}$ and the lower limit value $T_{MIN}$ corresponding to the time period elapsed after the start of the engine to the comparator 13.

The comparator 13 compares the catalyst temperature $T_{EHC}$ indicated by the catalyst temperature signal from the temperature calculator 11 with the values of the upper limit value $T_{MAX}$ and the lower limit value $T_{MIN}$ from the temperature value memory 12. If the catalyst temperature $T_{EHC}$ exceeds the upper limit value $T_{MAX}$ ($T_{EHC}>T_{MAX}$), or if the catalyst temperature $T_{EHC}$ falls below the lower limit value $T_{MIN}$ ($T_{EHC}<T_{MIN}$), the comparator 13 delivers the determination signal $H_O$ high in level to the switch controller 8.

The comparator 13 also delivers the high-level determination signal $H_O$ to the abnormality-detecting circuit 10, which determines whether the EHC 2 is abnormal in operation, from the determination signal $H_O$, and carries out visual or audio indication of abnormality of the EHC 2.

On the other hand, if the catalyst temperature signal $T_{EHC}$ is equal to or higher than the lower limit value $T_{MIN}$ and equal to or lower than the upper limit value $T_{MAX}$ ($T_{MIN} \leq T_{EHC} \leq T_{MAX}$), the comparator 13 delivers the determination signal $H_O$ low in level to the switch controller 8.

The low-level determination signal $H_O$ is also delivered to the abnormality-detecting circuit 10, which determines from the determination signal $H_O$ that the EHC 2 is functioning normally, and does not carry out visual or audio indication.

Further, when a predetermined time period has elapsed after the start of the engine, the comparator 13 delivers the high-level determination signal $H_O$ to the switch controller 8 upon receiving a timer signal tk delivered from the timer 14, whereby the supply of power to the EHC 2 is interrupted.

The timer 14 operates on frequency-divided reference clock pulses to start measurement of an elapsed time period in response to a power-on reset signal $P_{ON}$ generated when the ignition switch is turned on to apply direct current to the controller 6. When a predetermined time period has elapsed, the timer 14 delivers the timer signal tk to the comparator 13.

Thus, the operative state-detecting circuit 7 calculates the catalyst temperature $T_{EHC}$ based on the voltage signal $V_{EO}$ and the current signal $I_{EO}$ and detects a temperature rise characteristic of the EHC 2 based on the calculated catalyst temperature $T_{EHC}$. By monitoring the temperature rise characteristic of the EHC 2, the electrically heated catalyst control system of the present embodiment controls the supply of power to the EHC 2 while detecting whether there is an abnormality in the EHC 2.

Figure 8:
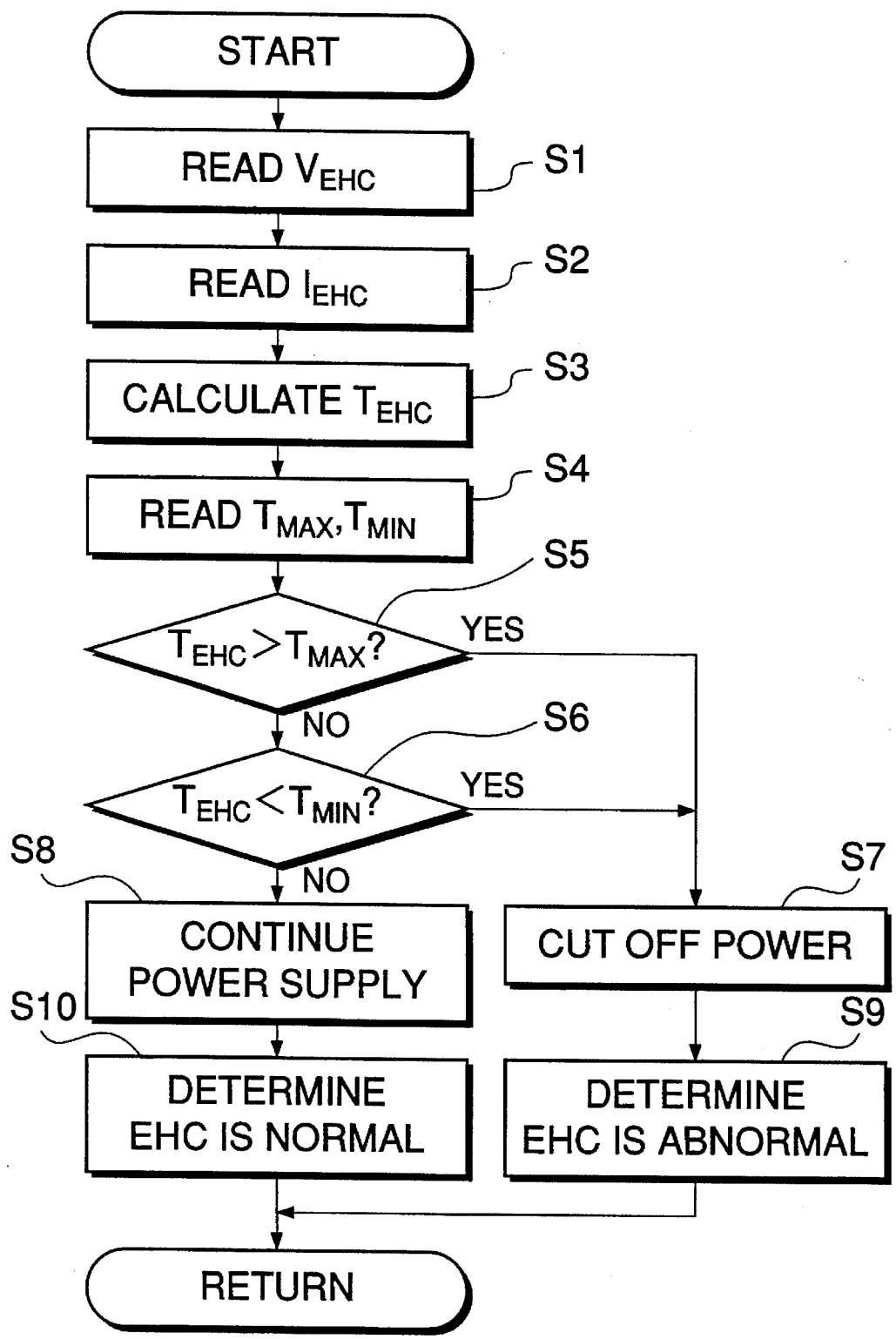
FIG. 8 is a flowchart showing a program executed by the electrically heated catalyst control system according to the first embodiment.

FIG. 8 shows a program carried out by the electrically heated catalyst control system of the present embodiment, particularly the operative state-detecting circuit 7 of FIG. 3. This program is executed through interrupt processing by the microprocessor at predetermined time intervals after the ignition switch of the vehicle is turned on.

Before the start of the program, the ignition switch of the vehicle is turned on, and the supply DC voltage $E_O$ is applied to the controller 6. In response to the power-on reset signal $P_{ON}$ generated upon the first application of the supply DC voltage $E_O$ to the controller 6, the controller 6 is initialized, thereby permitting the supply DC voltage $E_O$ to be applied to the EHC 2 to start heating of the same.

First, at a step S1, the voltage signal $V_{EO}$ from the voltage detector 3, which indicates the voltage $V_{EHC}$ applied to the EHC 2, is read in, and at a step S2, the current signal $I_{EO}$ from the current detector 4, which indicates the current $I_{EHC}$ flowing through the EHC 2, is read in.

Then, the catalyst temperature $T_{EHC}$ is calculated by the use of the aforementioned equation (1), based on the voltage signal $V_{EO}$ and the current signal $I_{EO}$ at a step S3. Then, the upper limit value $T_{MAX}$ and the lower limit value $T_{MIN}$ of the catalyst temperature corresponding to the elapsed time period are read from the memory at a step S4, to compare the catalyst temperature $T_{EHC}$ with the upper limit value $T_{MAX}$ at a step S5 and also compare the same with the lower limit value $T_{MIN}$ at a step S6 if the condition of $T_{EHC} \leq T_{MAX}$ is fulfilled at the step S5.

If it is determined at the step S5 or S6 that the catalyst temperature $T_{EHC}$ falls outside the range defined by the upper limit value $T_{MAX}$ and the lower limit value $T_{MIN}$ ($T_{EHC}<T_{MIN}$, or $T_{MAX}<T_{EHC}$), the comparator 13 delivers the determination signal $H_O$ high in level to cut off the supply of power to the EHC 2 at a step S7, and at the same time it is judged at a step S9 that the EHC 2 is functioning abnormally If it is determined at the step S9 that the EHC 2 is functioning abnormally, the abnormality-detecting circuit 10 indicates the abnormality of the EHC 2 through visual or audio indication.

On the other hand, if the catalyst temperature $T_{EHC}$ falls within the range defined by the upper limit value $T_{MAX}$ and the lower limit value $T_{MAX}$ ($T_{MIN} \leq T_{EHC} \leq T_{MAX}$), the comparator 13 continues to deliver the determination signal $H_O$ low in level, thereby permitting power or supply DC voltage $E_O$ to be applied to the EHC 2 until the predetermined time period tk elapses, at a step S8. At the same time, it is judged at a step S10 that the EHC 2 is functioning normally.

Next, description will be made of the operation of the second to fifth embodiments, which use respective operative state-detecting circuits shown in FIGS. 4 to 7. However, description will be omitted of programs carried out by these embodiments.

Figure 4:
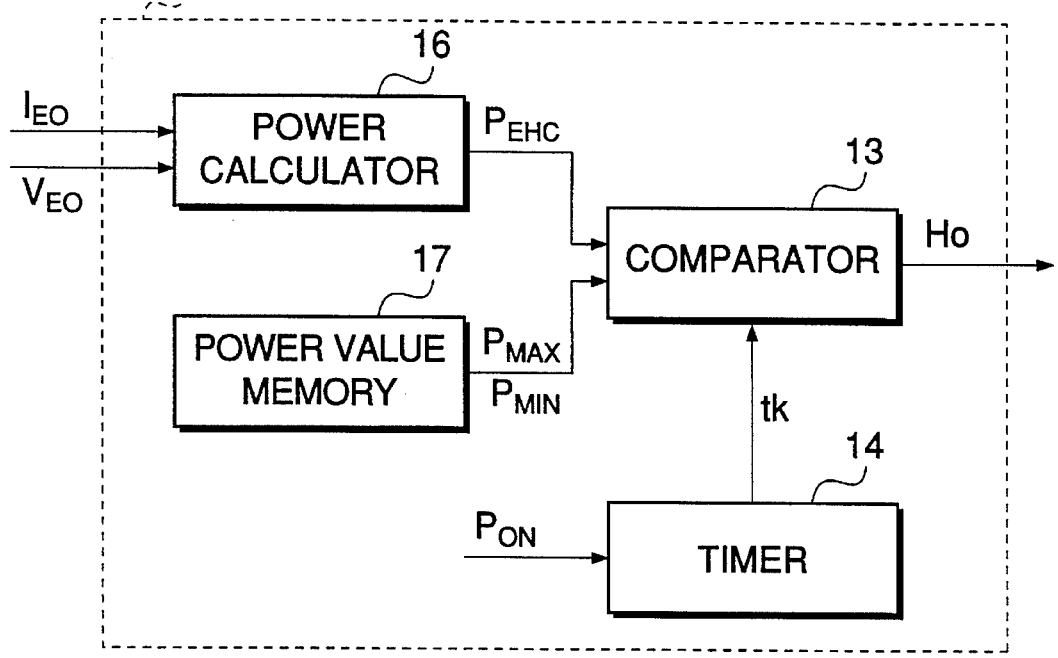
FIG. 4 is a circuit diagram showing the arrangement of essential parts of an operative state-detecting circuit of the electrically heated catalyst control system according to the second embodiment.

FIG. 4 shows the arrangement of essential parts of an operative state-detecting circuit of the electrically heated catalyst control system according to the second embodiment.

In this embodiment, the operative state of the EHC 2 is determined based on the catalyst consumption power $P_{EHC}$ calculated from the voltage signal $V_{EO}$ and the current signal $I_{EO}$.

The operative state-detecting circuit 15 shown in FIG. 4 is distinguished from the operative state-detecting circuit 7 of the first embodiment shown in FIG. 3 in that the temperature calculator 11 is replaced by a power calculator 16 and the temperature value memory 12 by a power value memory 17.

The operative state-detecting circuit 15 is comprised of the power calculator 16, the power value memory 17, the comparator 13, and the timer 14. The operative state-detecting circuit 15 calculates the catalyst consumption power $P_{EHC}$ from the voltage signal $V_{EO}$ and the current signal $I_{EO}$ and compares the catalyst consumption power $P_{EHC}$ thus calculated with an upper limit value $P_{MAX}$ and a lower limit value $P_{MIN}$ both set to respective predetermined values. If the catalyst consumption power $P_{EHC}$ falls outside a range defined by the upper limit value $P_{MAX}$ and the lower limit value $P_{MIN}$ ($P_{EHC}<P_{MIN}$ or $P_{MAX}<P_{EHC}$), the operative state-detecting circuit 15 delivers the determination signal $H_O$ high in level to cause the switch controller 8 to turn off the switch 5, whereby the supply of power to the EHC 2 is cut off and at the same time the driver is notified of abnormality of the EHC 2 which is then detected.

On the other hand, if the catalyst consumption power $P_{EHC}$ falls within the range defined by the upper limit value $P_{MAX}$ and the lower limit value $P_{MIN}$ ($P_{MIN} \leq P_{EHC} \leq P_{MAX}$), the operative state-detecting circuit 15 delivers the determination signal $H_O$ low in level to cause the switch controller 8 to hold the switch 5 on, whereby the supply of power to the EHC 2 is continued.

The power calculator 16 operates to calculate the catalyst consumption power $P_{EHC}$ by the use of the following equation (2), based on the voltage signal $V_{EO}$ and the current signal $I_{EO}$ and delivers a signal indicative of the catalyst consumption power $P_{EHC}$ to the comparator 13:

$$P_{EHC} = V_{EO} \times I_{EO} \tag{2}$$

The power value memory 17, which is formed of a ROM or the like, stores data of values of the upper limit value $P_{MAX}$ and the lower limit value $P_{MIN}$ of the catalyst consumption power set based on design values and/or experimentally obtained values of the same, and supplies the upper limit value $P_{MAX}$ and the lower limit value $P_{MIN}$ to the comparator 13 as time elapses after the start of the engine.

The comparator 13 and the timer 14 of the present embodiment are identical in construction and operation with those of the first embodiment. That is, the operative state-detecting circuit 15 of the present embodiment calculates the consumption power $P_{EHC}$ from the voltage signal $V_{EO}$ and the current signal $I_{EO}$ and compares the consumption power $P_{EHC}$ thus calculated with the upper limit value $P_{MAX}$ and the lower limit value $P_{MIN}$, whereby an instantaneous power characteristic of the EHC 2 is detected, to control the supply of power to the EHC 2, and at the same time it is determined whether the EHC 2 is functioning normally.

Figure 5:
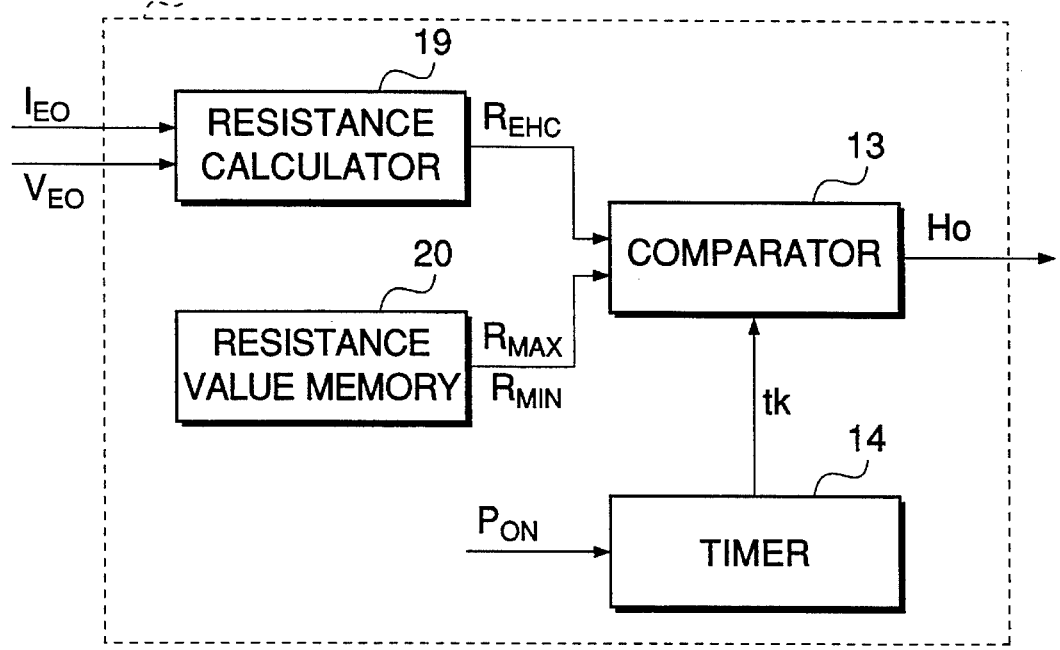
FIG. 5 is a circuit diagram showing the arrangement of essential parts of an operative state-detecting circuit of the electrically heated catalyst control system according to the third embodiment.

FIG. 5 shows the arrangement of essential parts of an operative state-detecting circuit of the electrically heated catalyst control system according to the third embodiment.

In this embodiment, the operative state of the EHC 2 is determined based on the catalyst resistance $R_{EHC}$ calculated from the voltage signal $V_{EO}$ and the current signal $I_{EO}$.

The operative state-detecting circuit 18 shown in FIG. 5 is distinguished from the operative state-detecting circuit 7 of the first embodiment shown in FIG. 3 in that the temperature calculator 11 is replaced by a resistance calculator 19 and the temperature value memory 12 by a resistance value memory 20.

The operative state-detecting circuit 18 operates to calculate the catalyst resistance $R_{EHC}$ by the use of the following equation (3), based on the voltage signal $V_{EO}$ and the current signal $I_{EO}$ and delivers a signal indicative of the calculated catalyst resistance $R_{EHC}$ to the comparator 13:

$$R_{EHC} = V_{EO}/I_{EO} \tag{3}$$

The resistance value memory 20, which is formed of a ROM or the like, stores data of values of an upper limit value $R_{MAX}$ and a lower limit value $R_{MIN}$ of the catalyst resistance set based on design values and/or experimentally obtained values of the catalyst resistance, and supplies the upper limit value $R_{MAX}$ and the lower limit value $R_{MIN}$ of the catalyst resistance to the comparator 13 as time elapses after the start of the engine.

The comparator 13 compares the catalyst resistance $R_{EHC}$ with the upper limit value $R_{MAX}$ and the lower limit value $R_{MIN}$. If the catalyst resistance $R_{EHC}$ falls outside a range defined by the upper limit value $R_{MAX}$ and the lower limit value $R_{MIN}$ ($R_{EHC} < R_{MIN}$ or $R_{MAX} < R_{EHC}$), the operative state-detecting circuit 18 delivers the determination signal $H_O$ high in level to cut off the supply of power to the EHC 2 and notify the driver of the abnormality of the EHC 2. On the other hand, if the catalyst resistance $R_{EHC}$ falls within the range defined by the upper limit value $R_{MAX}$ and the lower limit value $R_{MIN}$ ($R_{MIN} \leq R_{EHC} \leq R_{MAX}$), the operative state-detecting circuit 18 delivers the determination signal $H_O$ low in level to thereby permit the supply of power to the EHC 2 to be continued.

Even if the catalyst resistance $R_{EHC}$ falls within the aforementioned range ($R_{MIN} \leq R_{EHC} \leq R_{MAX}$), the comparator 13 delivers the determination signal $H_O$ high in level to cut off power to the EHC 2 when the timer signal tk indicative of the lapse of the predetermined time period from the start of the engine is received from the timer 14.

Figure 6:
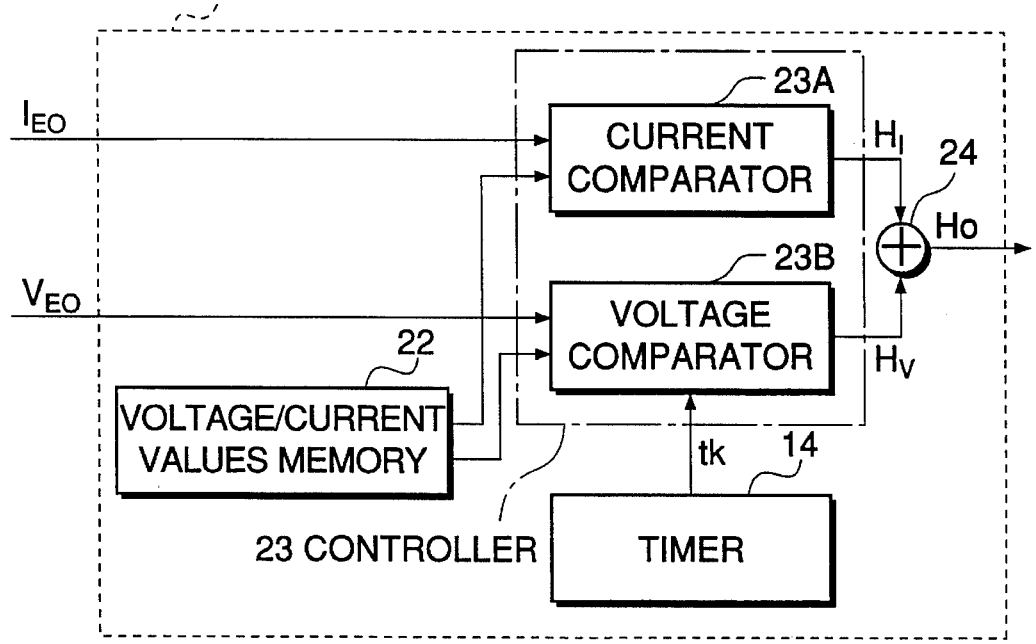
FIG. 6 is a circuit diagram showing the arrangement of essential parts of an operative state-detecting circuit of the electrically heated catalyst control system according to the fourth embodiment.

FIG. 6 shows the arrangement of essential parts of an operative state-detecting circuit of the electrically heated catalyst control system according to the fourth embodiment.

In this embodiment, the operative state of the EHC 2 is determined based on characteristics of the voltage signal $V_{EO}$ and the current signal $I_{EO}$ relative to elapsed time.

In the figure, the operative state-detecting circuit 21 is comprised of a voltage/current values memory 22, a controller 23 including a current comparator 23A and a voltage comparator 23B, a logical OR circuit 24, and the timer 14. In the operative state-detecting circuit 21 of the present embodiment, the current comparator circuit 23A compares the value of the current signal $I_{EO}$ indicative of the current $I_{EHC}$ with an upper limit value $I_{MAX}$ and a lower limit value $I_{MIN}$ thereof read from the voltage/current value memory 22, while the voltage comparator 23B compares the value of the voltage signal $V_{EO}$ indicative of the voltage $V_{EO}$ with an upper limit value $V_{MAX}$ and a lower limit value $V_{MIN}$ thereof read from the same.

If the value of the current signal $I_{EO}$ falls outside a range defined by the upper limit value $I_{MAX}$ and the lower limit value $I_{MIN}$ ($I_{EO} < I_{MIN}$ or $I_{MAX} < I_{EO}$), the operative state-detecting circuit 21 delivers a current comparison result signal $H_I$ e.g. at a high level. On the other hand, if the value of the current signal $I_{EHC}$ falls within the range defined by the upper limit value $I_{MAX}$ and the lower limit value $I_{MIN}$ ($I_{MIN} \leq I_{EO} \leq I_{MAX}$), the operative state-detecting circuit 21 delivers the current comparison result signal $H_I$ at a low level.

If the value of the voltage $V_{EO}$ falls outside a range defined by the upper limit value $V_{MAX}$ and the lower limit value $V_{MIN}$ ($V_{EO} < V_{MIN}$ or $V_{MAX} < V_{EO}$), the operative state-detecting circuit 21 delivers a voltage comparison result signal $H_V$ e.g. at a high level. On the other hand, if the value of the voltage signal $V_{EO}$ falls within the range defined by the upper limit value $V_{MAX}$ and the lower limit value $V_{MIN}$ ($V_{MIN} \leq V_{EO} \leq V_{MAX}$), the operative state-detecting circuit 21 delivers the voltage comparison result signal $H_V$ at a low level.

The logical OR circuit 24 carries out an OR operation of the current comparison signal $H_I$ and the voltage comparison signal $H_V$ and delivers a logical sum signal ($H_I+H_V$) as the determination signal $H_O$, whereby if one of the current comparison result signal $H_I$ and the voltage comparison result signal $H_V$ is at the high level, the determination signal $H_O$ high in level is delivered from the logical OR circuit 24 to cut off the supply of power to the EHC 2, and at the same time it is determined that the EHC 2 is functioning abnormally and the driver is notified of the abnormality of the EHC 2. On the other hand, if both the current comparison result signal $H_I$ and the voltage comparison result signal $H_V$ are low in level, the determination signal $H_O$ low in level is delivered from the logical OR circuit 24 to permit the supply of power to the EHC 2 to be continued.

Even if the determination signal $H_O$ is at the low level, the current comparison result signal $H_I$ and the voltage comparison result signal $H_V$ are both set to the high level when the timer signal tk indicative of the lapse of the predetermined time period from the start of the engine is received from the timer 14, to thereby cut off the supply of power to the EHC 2.

Figure 7:
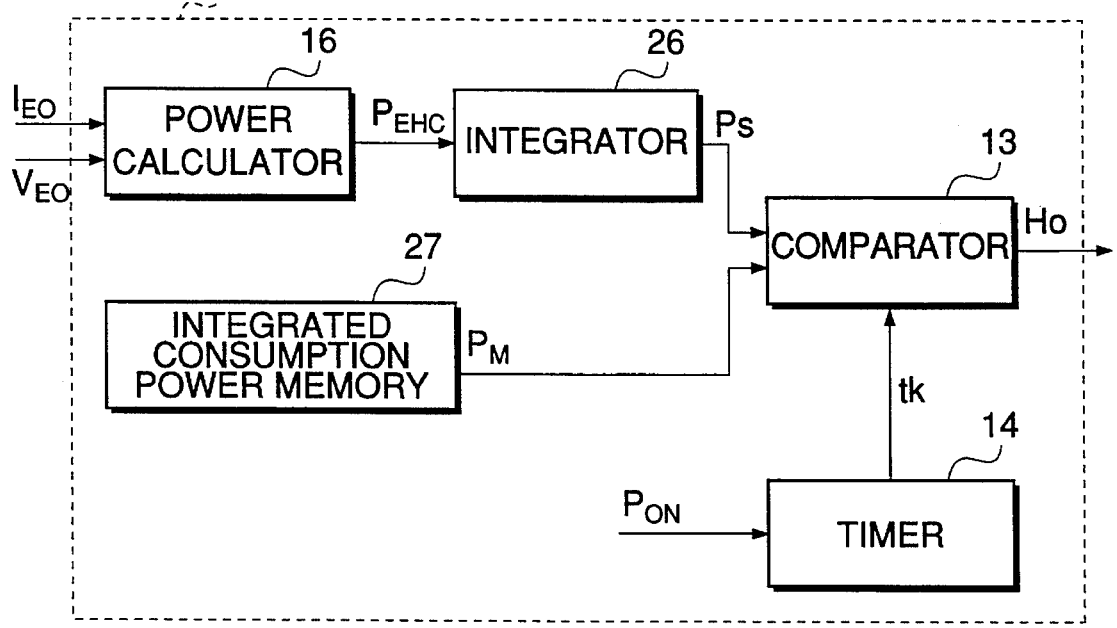
FIG. 7 is a circuit diagram showing the arrangement of essential parts of an operative state-detecting circuit of the electrically heated catalyst control system according to the fifth embodiment.

FIG. 7 shows the arrangement of essential parts of an operative state-detecting circuit of the electrically heated catalyst control system according to the fifth embodiment.

In the present embodiment, the operative state of the EHC 2 is determined based on the catalyst integrated consumption power $P_S$ calculated from the voltage signal $V_{EO}$ and the current signal $I_{EO}$.

The operative state-detecting circuit 25 is comprised of the power calculator 16, an integrator 26, an integrated consumption power value memory 27, the comparator 13, and the timer 14.

The integrator 26 operates to time-integrate a catalyst consumption power $P_{EHC}$ (=$V_{EO} \times I_{EO}$) indicated by the signal from the power calculator 16, described hereinabove in the second embodiment, by the use of the following equation (4), and delivers a signal indicative of the integrated catalyst consumption power value $P_s$ to the comparator means 13:

$$P_S = \int_0^T P_{EHC} \, dt \quad (4)$$

The integrated consumption power value memory 27, which is formed of a ROM or the like, stores data of an optimum integrated consumption power $P_M$ value required for the optimum heating of the EHC 2 and values of an upper limit value $P_{SMAX}$ and a lower limit value $P_{SMIN}$ of the integrated catalyst consumption power set relative to a time period elapsed after the start of the engine, and supplies the integrated value of the optimum consumption power $P_M$, a value of the upper limit value $P_{SMAX}$ and a value of the lower limit value $P_{SMIN}$ corresponding to the time period elapsed after the start of the engine, to the comparator 13, as time elapses after the start of the engine.

The comparator 13 compares the integrated catalyst consumption power $P_S$ with the optimum integrated consumption power $P_M$, the same with the upper limit value $P_{SMAX}$, and the same with the lower limit value $P_{SMIN}$. If the integrated catalyst consumption power $P_S$ exceeds the optimum integrated consumption power $P_M$ ($P_S > P_M$), or if the integrated catalyst consumption power $P_S$ exceeds the upper limit value $P_{SMAX}$ ($P_S > P_{SMAX}$), or if the integrated catalyst consumption power $P_S$ falls below the lower limit value $P_{MIN}$ ($P_S < P_{MIN}$), the comparator 13 delivers the determination signal $H_O$ high in level to immediately cut off the supply of power to the EHC 2 and at the same time indicate abnormality of the EHC 2.

On the other hand, if the integrated catalyst consumption power $P_S$ is equal to or lower than the optimum integrated consumption power $P_M$ (i.e. if $P_S \leq P_M$) and at the same time the integrated catalyst consumption power $P_S$ is equal to or higher than the lower limit value $P_{SMIN}$ and equal to or lower than the upper limit value $P_{SMAX}$ ($P_{SMIN} \leq P_S \leq P_{SMAX}$), the comparator 13 delivers the determination signal $H_O$ low in level to thereby permit the supply of power to the EHC 2 to be continued.

In addition, the control may be carried out such that the determination signal $H_O$ low in level is delivered when one of these conditions ($P_S \leq P_M$ and $P_{SMIN} \leq P_S \leq P_{MAX}$) is fulfilled.

Figure 9A:
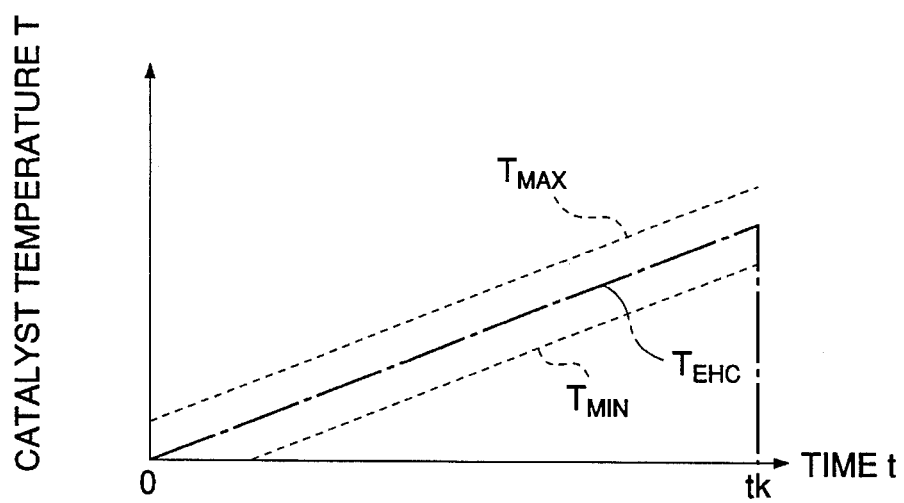
FIG. 9A to FIG. 9C are diagrams showing characteristics of temperature, power consumption, and electric resistance of an electrically heated catalyst, plotted versus time, respectively, which are useful in explaining the operation of the operative state-detecting circuits of the electrically heated catalyst, control systems according to the first to third embodiments.
Figure 9B:
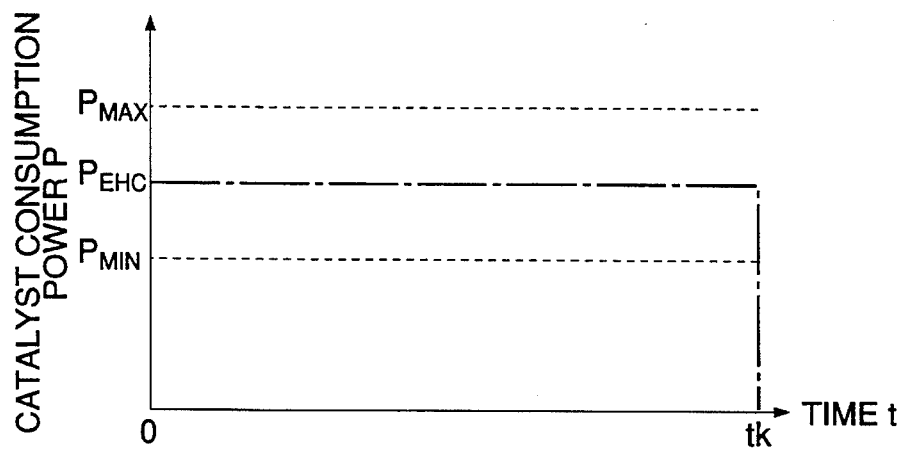
Figure 9C:
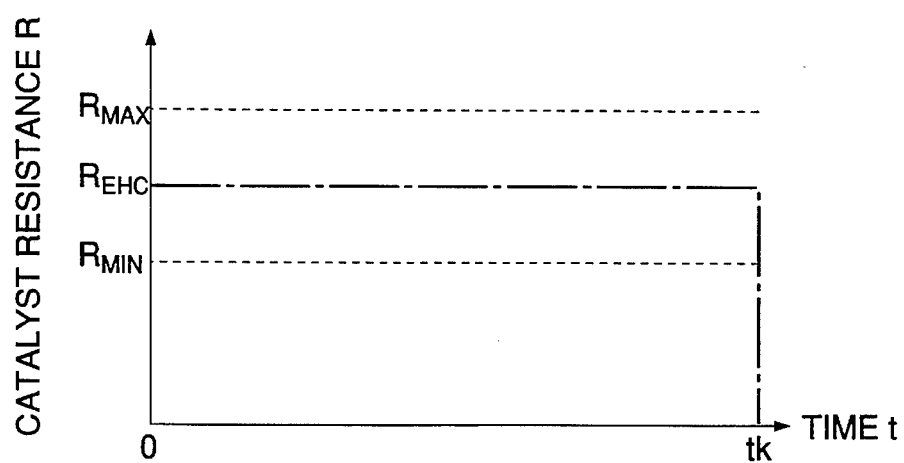
Figure 10A:
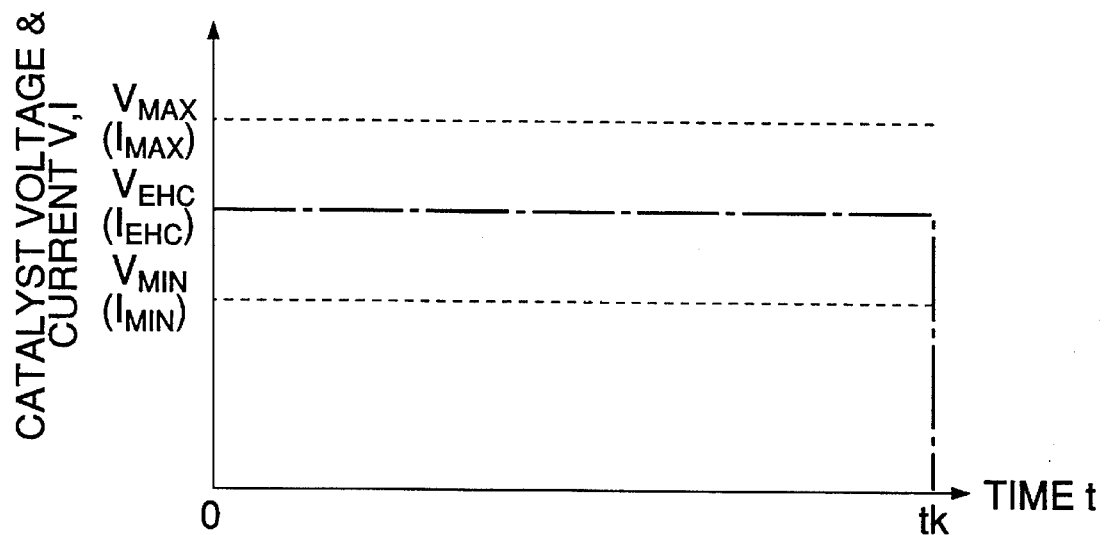
FIG. 10A and FIG. 10B are diagrams showing characteristics of voltage/current and integrated consumption power of the electrically heated catalyst plotted versus time, respectively, which are useful in explaining the operation of the operative state-detecting circuits of the electrically heated catalyst control systems according to the fourth and fifth embodiments.
Figure 10B:
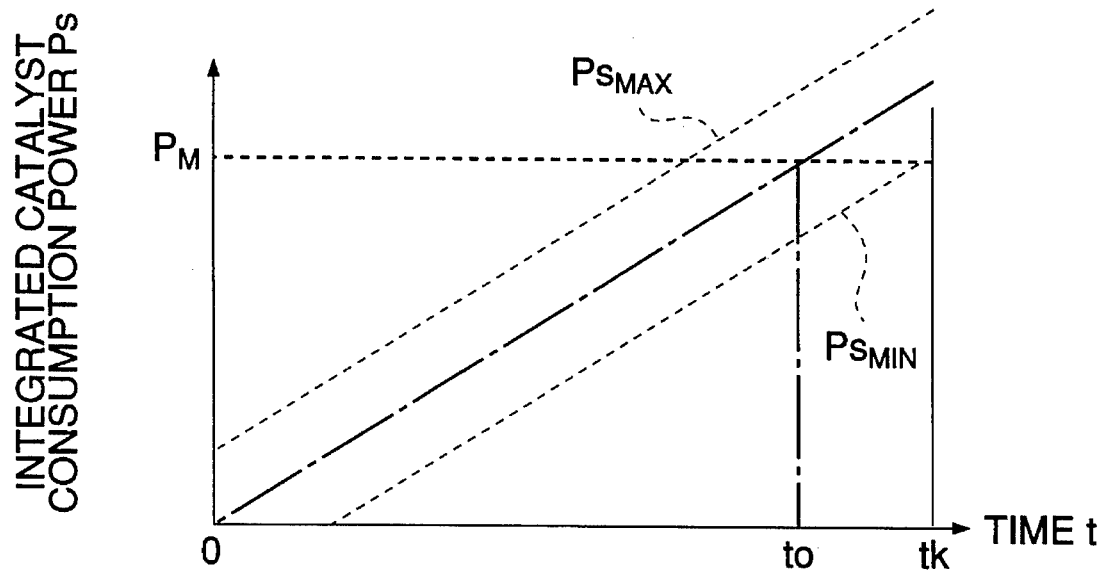

FIGS. 9A to 9C show characteristics of the catalyst temperature, the catalyst consumption power, and the catalyst resistance, plotted versus elapsed time, which are detected by the operative state-detecting circuits 7, 15 and 18 of the first to third embodiments, while FIGS. 10A and 10B show characteristics of the voltage current and the integrated catalyst consumption power, plotted versus elapsed time, which are detected by the operative state-detecting circuits 21 and 25 of the fourth and fifth embodiments, respectively.

FIG. 9A shows the catalyst temperature characteristic, i.e. temperature rise characteristic of the catalyst temperature $T_{EHC}$ relative to elapsed time. By comparing the catalyst temperature $T_{EHC}$ with the upper limit value $T_{MAX}$ and the lower limit value $T_{MIN}$ which vary with the elapsed time, it is possible to detect abnormality of the EHC 2.

FIGS. 9B and 9C show characteristics of the catalyst consumption power $P_{EHC}$ and the catalyst resistance $R_{EHC}$, respectively. By comparing the catalyst consumption power $P_{EHC}$ with the upper limit value $P_{MAX}$ and the lower limit value $P_{MIN}$ set to respective fixed values regardless of the elapsed time, and the catalyst resistance $R_{EHC}$ with the upper limit value $R_{MAX}$ and the lower limit value $R_{MIN}$ set to respective fixed values regardless of the elapsed time, it is possible to detect abnormality of the operative state of the EHC 2.

FIG. 10A shows characteristics of the voltage $V_{EHC}$ and the current $I_{EHC}$ relative to elapsed time. By comparing the voltage $V_{EHC}$ with the upper limit value $V_{MAX}$ and the lower limit value $V_{MIN}$ set to respective constant values regardless of the elapsed time, and the current $I_{EHC}$ with the upper limit value $I_{MAX}$ and the lower limit value $I_{MIN}$ set to respective constant values regardless of the elapsed time, it is possible to detect abnormality of the operative state of the EHC 2.

FIG. 10B shows characteristics of the integrated catalyst consumption power $P_S$ which increases with elapsed time. By comparing the integrated catalyst consumption power $P_S$ with the optimum integrated consumption power $P_M$ set to a constant value regardless of the elapsed time, and the same with the upper limit value $P_{SMAX}$ and the lower limit value $P_{SMIN}$ which vary with the elapsed time, it is possible to detect abnormality of the operative state of the EHC 2.

Although in the above described embodiments, the operative state-detecting circuits detects the operative state of the electrically heated catalyst (EHC), based on one of the catalyst temperature, the catalyst consumption power, the catalyst resistance, the voltage/current, and the integrated catalyst consumption power, this is not limitative, but a combination of the above parameters may be used to detect the operative state of the EHC to enhance the accuracy of detection of abnormality.

What is claimed is:

1. A control system for an electrically heated catalyst for purifying exhaust gases emitted from an internal combustion engine, comprising:

voltage-detecting means for detecting voltage applied to said electrically heated catalyst;

current-detecting means for detecting electric current flowing through said electrically heated catalyst;

switch means for making a changeover between supply and interrupt of power to said electrically heated catalyst;

operative state-detecting means for calculating a parameter indicative of an operative state of said electrically heated catalyst, based on an output from said voltage-detecting means and an output from said current-detecting means, and for detecting said operative state of said electrically heated catalyst, based on said parameter thus calculated; and switch controller means for controlling operation of said switch means, based on an output from said operative state-detecting means.

2. A control system according to claim 1, wherein said operative state-detecting means calculates catalyst temperature, based on said output from said voltage-detecting means and said output from said current-detecting means, and detects said operative state of said electrically heated catalyst, based on said catalyst temperature thus calculated.

3. A control system according to claim 1, wherein said operative state-detecting means calculates catalyst consumption power consumed by said electrically heated catalyst, based on said output from said voltage-detecting means and said output from said current-detecting means, and detects said operative state of said electrically heated catalyst, based on said catalyst consumption power thus calculated.

4. A control system according to claim 3, wherein said operative state-detecting means calculates an integrated value of said catalyst consumption power, and detects said operative state of said electrically heated catalyst, based on said integrated value of said catalyst consumption power thus calculated.

5. A control system according to claim 1, wherein said operative state-detecting means calculates catalyst resistance of said electrically heated catalyst, based on said output from said voltage-detecting means and said output from said current-detecting means, and detects said operative state of said electrically heated catalyst, based on said catalyst resistance thus calculated.

6. A control system according to claim 1, wherein said operative state-detecting means compares said output from said voltage-detecting means with a predetermined reference voltage value, and said output from said current-detecting means with a predetermined reference current value, to calculate said parameter indicative of said operative state of said electrically heated catalyst, and detects said operative state of said electrically heated catalyst, based on said parameter thus calculated.

7. A control system according to claim 6, wherein said operative state-detecting means comprises voltage comparator means for comparing said output from said voltage-detecting means with said predetermined reference voltage value, current comparator means for comparing said output from said current-detecting means with said predetermined reference current value, and logical OR means for calculating a logical sum of an output from said voltage comparator means and an output from said current comparator means.

8. A control system according to claim 1, wherein said operative state-detecting means comprises memory means for storing predetermined reference values set based on design values or experimentally obtained values of said parameter indicative of said operative state of said electrically heated catalyst, calculator means for calculating said parameter, based on said output from said voltage-detecting means and said output from said current-detecting means, and comparator means for comparing said parameter thus calculated with one of said predetermined reference values read from said memory means, and for outputting a result of said comparison.

9. A control system according to claim 1, wherein said current-detecting means comprises a non-contact sensor.

10. A control system according to claim 1, including abnormality-detecting means for detecting abnormality of said electrically heated catalyst, based on said output from said operative state-detecting means.

11. A control system for an electrically heated catalyst for purifying exhaust gases emitted from an internal combustion engine, comprising:

voltage-detecting means for detecting voltage applied to said electrically heated catalyst;

current-detecting means for detecting electric current flowing through said electrically heated catalyst;

operative state-detecting means for calculating a parameter indicative of an operative state of said electrically heated catalyst, based on an output from said voltage-detecting means and an output from said current-detecting means, and for detecting said operative state of said electrically heated catalyst based on said parameter thus calculated; and abnormality-detecting means for detecting abnormality of said electrically heated catalyst, based on an output from said operative state-detecting means.

12. A control system according to claim 11, including switch means for making a changeover between supply and interrupt of power to said electrically heated catalyst, and switch controller means for controlling operation of said switch means, based on said output from said operative state-detecting means.

13. A control system according to claim 11, wherein said operative state-detecting means calculates catalyst temperature, based on said output from said voltage-detecting means and said output from said current-detecting means, and detects said operative state of said electrically heated catalyst, based on said catalyst temperature thus calculated.

14. A control system according to claim 11, wherein said operative state-detecting means calculates catalyst consumption power consumed by said electrically heated catalyst, based on said output from said voltage-detecting means and said output from said current-detecting means, and detects said operative state of said electrically heated catalyst, based on said catalyst consumption power thus calculated.

15. A control system according to claim 14, wherein said operative state-detecting means calculates an integrated value of said catalyst consumption power, and detects said operative state of said electrically heated catalyst, based on said integrated value of said catalyst consumption power thus calculated.

16. A control system according to claim 11, wherein said operative state-detecting means calculates catalyst resistance of said electrically heated catalyst, based on said output from said voltage-detecting means and said output from said current-detecting means, and detects said operative state of said electrically heated catalyst, based on said catalyst resistance thus calculated.

17. A control system according to claim 11, wherein said operative state-detecting means compares said output from said voltage-detecting means with a predetermined reference voltage value, and said output from said current-detecting means with a predetermined reference current value, to calculate said parameter indicative of said operative state of said electrically heated catalyst, and detects said operative state of said electrically heated catalyst, based on said parameter thus calculated.

18. A control system according to claim 11, wherein said current-detecting means comprises a non-contact sensor.

* * * * *